Jan. 10, 1933.  R. S. COLLEY  1,893,580
WHEEL CHOCK
Filed Sept. 11, 1931
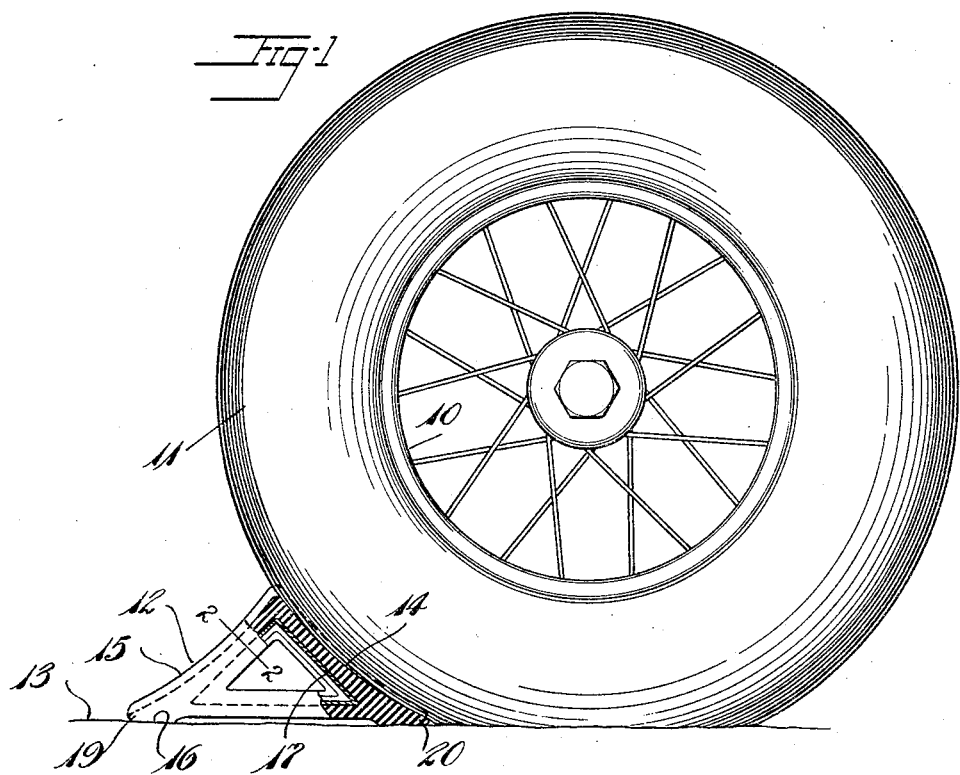
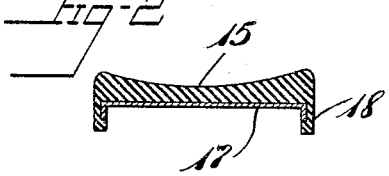
Inventor
Russell S. Colley
By Eakin & Avery
Attys.

Patented Jan. 10, 1933

1,893,580

UNITED STATES PATENT OFFICE

RUSSELL S. COLLEY, OF KENT, OHIO, ASSIGNOR TO THE B. F. GOODRICH COMPANY, OF NEW YORK, N. Y., A CORPORATION OF NEW YORK

WHEEL CHOCK

Application filed September 11, 1931. Serial No. 562,290.

My invention relates to wheel chocks such as are used to block the wheels of vehicles, particularly airplanes.

Airplanes designed for land use are generally equipped with landing gear comprising pneumatic tires of large cross-section and relatively small diameter which are inflated at low pressures. In warming up the engines of these planes it is necessary to block the wheels to prevent movement of the plane under the influence of the propeller. As the propeller shaft is located at an acute angle to the surface of the ground when the plane is resting thereon, the force of the propeller is applied to the wheels in a direction tending to lift the wheels from the ground. The weight of the plane is necessarily low as compared to the force of the propeller and the resultant of these two forces is such that a major component thereof is substantially parallel to the surface on which the plane rests. This necessitates the use of substantial blocking to prevent motion of the plane.

In the case of tri-motored planes, the lateral location of some of the motors with relation to the wheels, and the warming up of only one motor at a time as required by airport regulations, introduces a horizontal turning moment and any slipping of the chocks due to such motion would allow turning of the plane. Obviously any forward movement of the plane induces the lifting thereof as the wings are moved through the air, and where such movement is forward only at one side of the plane, the plane often noses over or at least damages the wings.

The adoption of concrete runways in an effort to eliminate dust and mud has increased the dangers to planes during the warm-up period as such chocks as have been in use present only slight frictional resistance to the smooth concrete surface of the runways.

The objects of the invention are to provide a light structure not readily damaged by abuse, which will present a relatively high frictional engagement with the runways, and one in which the lower edge will be so extended as to receive a substantial part of the vehicle's weight to increase its frictional engagement with the runway.

In the drawing:

Fig. 1 is a side elevation, partly in section, of the wheel chock with a loaded pneumatic-tired wheel in operative engagement therewith.

Fig. 2 is a cross-section taken on line 2—2 of Fig. 1.

Referring to the drawing, the numeral 10 designates the wheel of an airplane or other vehicle and 11 the pneumatic tire mounted thereon. The wheel chock of my invention is indicated by the numeral 12 and the ground surface or runway by the numeral 13.

The wheel chock comprises a rubber block of vulcanized rubber of a somewhat triangular shape having one or more curvilinear concave tire-engaging sides such as 14 and 15 and a substantially flat base 16. A hollow triangular frame 17, preferably made of sheet metal, is located within the rubber block and is united thereto by vulcanization. This frame strengthens the chock and limits the distortion of the rubber. It provides a passage through the chock to lighten its weight. The rubber material extends around the sides of the frame as indicated at 18, thereby protecting the frame.

The rubber surfaces 14 and 15 are preferably curved both longitudinally and laterally to conform to the tire to be blocked, the longitudinal curvature preferably being at a different radius on one face from that on the other so as to conform to a greater number of sizes of tires. The lateral curvature shifting with relation thereto.

The base portion 16, being faced with rubber, presents a relatively high frictional resistance to motion along the runway. This is substantially increased by the extension of the flexible rubber toes 19 and 20 beyond the frame 17 so that they under-lie the tire and are thus clamped between the tire and the runway and the chock is prevented from rolling over as well as from sliding.

I claim:

1. A wheel chock comprising a vulcanized rubber body having a base for engaging the ground and an adjacent concave surface for engaging the wheel and a rigid supporting frame located therein and secured thereto by vulcanization, the rubber body being extended beyond the frame to provide a resilient toe adapted to be clamped by the wheel to the supporting surface.

2. A wheel chock comprising a metal frame and a vulcanized rubber covering attached thereto, said chock having a base for engaging the ground and a plurality of adjacent concave wheel engaging surfaces, each of said wheel-engaging surfaces meeting the plane of said base at an acute angle, said surfaces being of different curvature to engage wheels of different sizes.

3. A wheel chock comprising a hollow reinforced vulcanized rubber body having a base for engaging the ground and an adjacent wheel engaging surface, said wheel engaging surface meeting the plane of the base at an acute angle and being of concave curvature both longitudinally and laterally.

4. A wheel chock comprising a hollow rigid prism of triangular cross-section, and a rubber covering surrounding its outer prismatic faces to provide a ground-engaging base and a pair of wheel-engaging surfaces angularly disposed with relation thereto, said covering being extended along the plane of the base to provide a flexible portion to underlie a wheel.

5. A wheel chock comprising a hollow rigid prism of triangular cross-section, and a rubber covering surrounding its outer prismatic faces to provide a ground-engaging base and a pair of wheel-engaging surfaces angularly disposed thereto, said wheel-engaging faces being of concave curvature both longitudinally and laterally.

In witness whereof I have hereunto set my hand this 10th day of September, 1931.

RUSSELL S. COLLEY.